US012639955B2

(12) United States Patent　(10) Patent No.: US 12,639,955 B2
Li et al.　(45) Date of Patent: May 26, 2026

(54) AUTOMATED VEHICLE IDENTIFICATION BASED ON CAR-FOLLOWING DATA WITH MACHINE LEARNING

(71) Applicant: University of South Florida, Tampa, FL (US)

(72) Inventors: Xiaopeng Li, Tampa, FL (US); Qianwen Li, Tampa, FL (US); Handong Yao, Tampa, FL (US); Zhaohui Liang, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 450 days.

(21) Appl. No.: 17/884,411

(22) Filed: Aug. 9, 2022

(65) Prior Publication Data

US 2023/0045550 A1　Feb. 9, 2023

Related U.S. Application Data

(60) Provisional application No. 63/231,168, filed on Aug. 9, 2021.

(51) Int. Cl.
*G06V 20/58*　(2022.01)
*G01S 19/01*　(2010.01)
*G06V 10/764*　(2022.01)
*G06V 10/82*　(2022.01)
*G06V 20/40*　(2022.01)

(52) U.S. Cl.
CPC ............. *G06V 20/58* (2022.01); *G01S 19/01* (2013.01); *G06V 10/764* (2022.01); *G06V 10/82* (2022.01); *G06V 20/41* (2022.01)

(58) Field of Classification Search
CPC ...... G06V 20/58; G06V 10/764; G06V 10/82; G06V 20/41; G06V 10/454; G01S 19/01
See application file for complete search history.

(56) References Cited

U.S. PATENT DOCUMENTS

| | | | |
|---|---|---|---|
| 8,457,827 B1 | 6/2013 | Ferguson et al. | |
| 9,552,735 B2 * | 1/2017 | Pilutti | B60Q 1/507 |
| 10,737,695 B2 | 8/2020 | Liu et al. | |

(Continued)

OTHER PUBLICATIONS

"Ekrem Baser et. al., Classification of Vehicles in Traffic and Detection Faulty Vehicles by Using ANN Techniques, Apr. 2017, 2017 Electric Electronics, Computer Science, Biomedical Engineerings' Meeting EBBT, Istanbul, Turkey" (Year: 2017).*

(Continued)

*Primary Examiner* — Chineyere Wills-Burns
*Assistant Examiner* — Phuong Hau Cai
(74) *Attorney, Agent, or Firm* — HUSCH BLACKWEL LLP

(57)　ABSTRACT

A system for identifying autonomous vehicles includes at least one sensor that may be configured to provide sensor data associated with at least two vehicles. A pre-processing module may be coupled to the at least one sensor and may be configured to determine a set of data including at least car following data based on the sensor data. An autonomous vehicle (AV)/human-driven vehicle (HV) identification neural network may be coupled to the pre-processing module and configured to generate an AV/HV identifier for at least one of the at least two vehicles based on at least the car following data during a predetermined time period.

10 Claims, 6 Drawing Sheets

(56)                    References Cited

U.S. PATENT DOCUMENTS

| | | | |
|---|---|---|---|
| 11,383,722 B2 * | 7/2022 | Dougherty | ........... G05D 1/0293 |
| 2021/0018918 A1 * | 1/2021 | Levandowski | ...... G06N 3/0464 |

OTHER PUBLICATIONS

"Susana Costa et. al., A Cooperative Human-Machine Interaction Warning Strategy for the Semi-Autonomous Driving Context, Nov. 2017, Future Technologies Conference 2019" (Year: 2019).*
Hallerbach, S., et al. (2018) "Simulation-based identification of critical scenarios for cooperative and automated vehicles." SAE International Journal of Connected and Automated Vehicles 1.2018-01-1066. pp. 93-106.
Zhao, X., et al. (2020). "Field experiments on longitudinal characteristics of human driver behavior following an autonomous vehicle". Transportation research part C: emerging technologies, 114: 205-224.

* cited by examiner

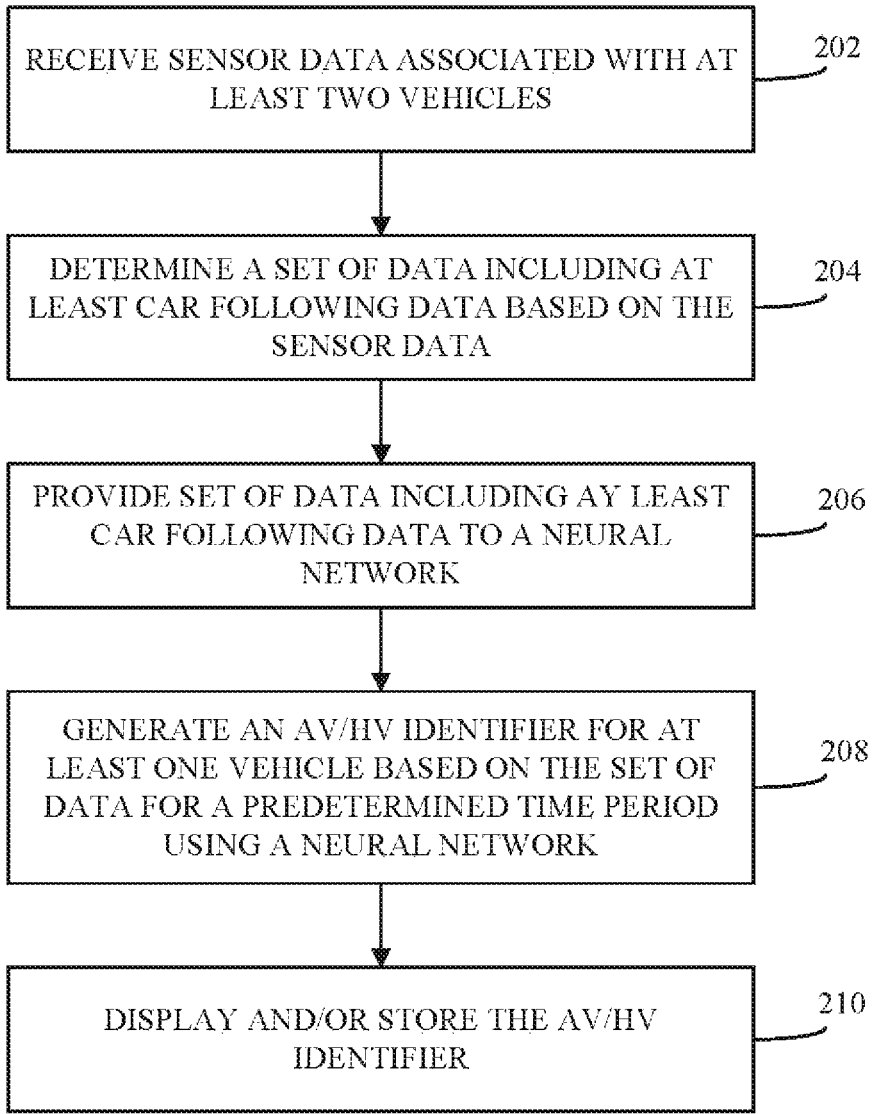

RECEIVE SENSOR DATA ASSOCIATED WITH AT LEAST TWO VEHICLES — 202

DETERMINE A SET OF DATA INCLUDING AT LEAST CAR FOLLOWING DATA BASED ON THE SENSOR DATA — 204

PROVIDE SET OF DATA INCLUDING AY LEAST CAR FOLLOWING DATA TO A NEURAL NETWORK — 206

GENERATE AN AV/HV IDENTIFIER FOR AT LEAST ONE VEHICLE BASED ON THE SET OF DATA FOR A PREDETERMINED TIME PERIOD USING A NEURAL NETWORK — 208

DISPLAY AND/OR STORE THE AV/HV IDENTIFIER — 210

FIG. 2

AUTOMATED VEHICLE IDENTIFICATION BASED ON CAR-FOLLOWING DATA WITH MACHINE LEARNING

CROSS-REFERENCE TO RELATED APPLICATIONS

This application is based on, claims priority to, and incorporates herein by reference in its entirety U.S. Ser. No. 63/231,168, filed Aug. 9, 2021 and entitled "Automated Vehicle Identification Based on Car-Following Data with Machine Learning."

STATEMENT OF GOVERNMENT SUPPORT

This invention was made in part with government support under 1558887 and 1932452 awarded by the National Science Foundation The Government may have certain rights in this invention.

TECHNICAL FIELD

The technology discussed below relates generally to automated identification of autonomous vehicles, and more particularly, to a system and method for identifying autonomous vehicles using machine learning and based on car-following data in a short time window.

BACKGROUND

Automated (or autonomous) vehicle (AV) technology holds great potential in enhancing traffic safety, elevating roadway capacity, reducing fuel consumption, and mitigating congestion. Around 10% of total vehicles sold in the second quarter of 2019 were commercial AVs, e.g., those with adaptive cruise control functions. It was predicted that 40% of vehicles on road would be automated by the 2040s. Despite the wide presence and burgeoning growth of AV technology, astonishingly, quite rare efforts have been made to identify AVs in mixed traffic. Existing commercial AVs (e.g., those with adaptive cruise control) cannot be easily identified with their appearances. Further, in the near future, commercial AVs may not have a mechanism to notify the AV type to surrounding vehicle or infrastructure units, given that connected vehicle technology may take time to be widely deployed. Without technology for detecting AVs on public roads, it may be hard to evaluate the performance of AVs and their impacts on surrounding vehicles at a large and realistic scale. Most existing studies on AV behaviors and their impacts on mixed traffic are simulation or small-scale tests involving a few AVs in experimental but not naturalistic settings. There are doubts whether the findings from these studies perfectly match real-world traffic. Further, without technology for detecting AVs on public roads, the corresponding safety risks and capacity concerns will remain unaddressed. Although AV technology is promising in decreasing the number of traffic accidents by reducing human errors, their share of rear-end crashes increases. The reason is that when human driven vehicles (HVs) are not aware that the preceding vehicles are AVs, they behave the same way as they are following HVs. In this case, the mismatch between AVs' actual driving behavior and HVs' expectations is likely to contribute to traffic accidents. Theoretical studies claimed that AVs can reduce headways via platooning and thus improve roadway capacity. However, it has been observed that current commercial AVs drive conservatively and even decrease roadway capacity. Without identifying AVs on public roads, the benefits of AV technology in elevating roadway capacity are limited and the problems in theoretical studies might still be left unaddressed. Therefore, identifying AVs in mixed traffic is much needed and has far-reaching implications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with an embodiment, a system for identifying autonomous vehicles includes at least one sensor configured to provide sensor data associated with at least two vehicles, a pre-processing module coupled to the at least one sensor and configured to determine a set of data including at least car following data based on the sensor data, and an autonomous vehicle (AV)/human-driven vehicle (HV) identification neural network coupled to the pre-processing module and configured to generate an AV/HV identifier for at least one of the at least two vehicles based on at least the car following data during a predetermined time period.

In accordance with another embodiment, a method for identifying autonomous vehicles includes receiving, from at least one sensor, sensor data associated with at least two vehicles, determining a set of data including at least car following data based on the sensor data using a pre-processing module, providing the set of data to an autonomous vehicle (AV)/human-driven vehicle (HV) neural network, and generating, using an autonomous vehicle (AV)/human-driven vehicle (HV) identification neural network, an AV/HV identifier for at least one of the at least two vehicles based on at least the car following data during a predetermined time period.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 2 illustrates a method for identifying autonomous vehicles (AVs) in accordance with an embodiment;

DETAILED DESCRIPTION

Figure 1:
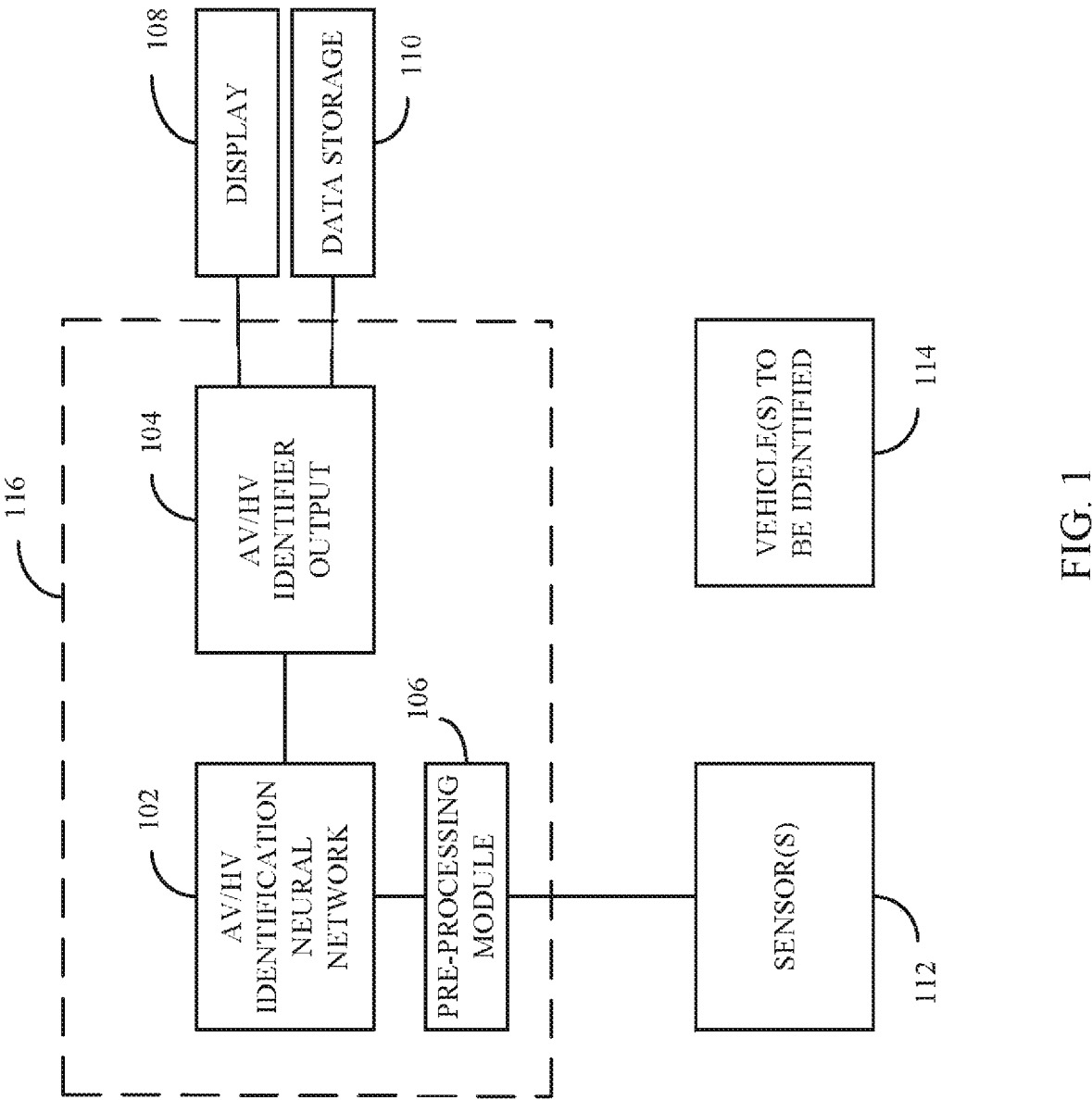
FIG. 1 is a block diagram of a system for identifying autonomous vehicles (AVs) in accordance with an embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments.

Automated (or autonomous) vehicles (AVs) with adaptive cruise control have been operating on public roads with a significant and rapidly growing market penetration. Identifying autonomous vehicles can be critical to understand near-future traffic characteristics and managing highway mobility and safety. The present disclosure describes systems and methods for identifying autonomous vehicles using car-following data. AV identification can be viewed as a complement to traditional vehicle classification that classifies human-driven vehicles (HVs) into various types (e.g., the Federal Highway Administration (FHWA) vehicle classes) based on their shapes and appearances. Traditional vehicle classification has been investigated for decades and various strategies have been proposed. Traditional vehicle classification strategies can be utilized in video-based traffic surveillance systems and can facilitate developing class-specific regulations to better manage the traditional traffic system, e.g., enforcing heavy-duty vehicle designated lanes. Further, with vehicle types identified, enriched trajectory data of the same type is available for further investigation, e.g., studying the fuel efficiency of trucks and the driving behavior difference between passenger cars and trucks. In some embodiments, AV identification technology can complement the traditional vehicle classification framework by considering a vehicle's dynamic performance. With AVs identified, roadway users could act properly. When following AVs, HVs can drive with caution to reduce crash risk and AVs could reduce the car-following distance for space efficiency. Transportation planners can make appropriate decisions to better handle mixed traffic stream, e.g., when to open AV dedicated lanes. Further, naturalistic AV field trajectory data may be available for assessing the impacts of AV technologies on safety, mobility, and energy performance. The yielded insights could be referred to during AV development, i.e., adaptive cruise control (ACC) configurations, to promote AV deployment.

In some embodiments, the disclosed systems and methods for identifying AVs may use externally observed vehicle motion information. In some embodiments, learning-based models may be constructed to identify AVs using car-following data in a predetermined time window. In some embodiments, the predetermined time window may advantageously be a short time window, for example, less than or equal to 5s. In some embodiments, the car following data may advantageously be derived from vehicle trajectories that can be obtained from existing infrastructure (e.g., GPS devices, road-side sensors) and economic technologies (e.g., video analytics). Identifying AVs from traffic streams can be used, for example, to enhance traffic safety, improve roadway capacity, and facilitate AV management and development.

FIG. 1 is a block diagram of a system for identifying autonomous vehicles (AVS) in accordance with an embodiment. In FIG. 1, the system includes an AV/HV identification neural network 102, an AV/HV identifier output 104, a pre-processing module 106, and sensor(s) 112. In some embodiments, the AV/HV identification neural network, 102, the AV/HV identifier output 104, and the pre-processing module 106 may be implemented and stored on one or more processors 116 (or processor devices). The processor (or processors) 116 may include any suitable hardware and components designed or capable of carrying out a variety of processing and control tasks, including pre-processing of data and identifying and classifying AV and HV vehicles. For example, the processor 116 may include a programmable processor or combination of programmable processors, such as central processing units (CPUs), graphics processing units (GPUs), and the like. In some implementations, the processor 116 may be configured to execute instructions stored in a non-transitory computer readable-media. In this regard, the processor 116 may be any device or system designed to integrate a variety of software, hardware, capabilities and functionalities. Alternatively, and by way of particular configurations and programming, the processor 116 may be a special-purpose system or device. For instance, such special-purpose system or device may include one or more dedicated processing units or modules that may be configured (e.g., hardwired, or pre-programmed) to carry out steps, in accordance with aspects of the present disclosure. In some embodiments, the AV/HV identification neural network 102, the AV/HV identifier output 104, and the pre-processing module 106 may be implemented on-board a vehicle (e.g., an AV or an HV vehicle). In some embodiments, the AV/HV identification neural network 102, the AV/HV identifier output 104, and the pre-processing module 106 may be implemented at a location external (or off-board) to one more vehicles in traffic, for example, as part of a roadside traffic monitoring system.

The AV/HV identification neural network 102 may be configured to identify or classify one or more vehicle(s) 114 (e.g., a preceding vehicle or a following vehicle) as AV or HV based on data from one or more sensor(s) 112 including car following data. The sensor(s) 112 may be, for example, a GPS sensor or a camera (e.g., to acquire video) that may be sued to acquire, for example position or trajectory data. In some embodiments, the one or more sensors 112 may be implemented on-board the same vehicle as the AV/HV identification neural network 102, the AV/HV identifier output 104, the pre-processing module 106 and processor 116. In some embodiments, the one or more sensors 112 may be implemented at a location external (or off-board) to one more vehicles 114 in traffic, for example, as part of a roadside traffic monitoring system. Sensor(s) 112 (e.g., GPS device(s) or roadside sensor(s) such as video cameras) may be coupled to the pre-processing module 106. The data (e.g., raw data) acquired from sensor(s) 112 (e.g., position data from a GPS sensor or video) may be provided as input to the pre-processing module 106 which is configured to derive or extract additional types of data from the sensor data to be input to the AV/HV identification neural network 102. For example, the pre-processing module 106 may be configured to generate or extract car following distance and spacing, car following trajectory, vehicle speed, vehicle acceleration, etc. from GPS position data or video. In some embodiments, the pre-processing module 106 may be configured to compute vehicle location based on the vehicle longitude and latitude. In some embodiments, the pre-processing module 106 may be configured to derive a car following distance as the vehicle location difference minus vehicle length. In some embodiments, the pre-processing module 106 may be configured to calculate vehicle acceleration as the first-order differential of the speed. In some embodiments, the sensor(s) 112 may be configured to detect lateral movements (e.g., lane changing) or the pre-processing module 106 may be configured to determine lateral movements based on the data from the sensor(s) 112 and lateral movements may also be used as an input to the AV/HV identification neural network 102 to identify AV vehicles. In some embodiments, the pre-processing module 106 may also be configured to standardize the data to be input to the AV/HV identification neural network 102, for example, data such as distance, speed, and acceleration may be standardized between −1 and 1.

The data from sensor(s) 112 and pre-processing module 106 may be input to the trained AV/HV identification neural network 102 which is configured to identify or classify a vehicle(s) 114 as AV or HV based on the input data including the car following data. In some embodiments, the AV/HV identification neural network 102 may also be trained and configured to further classify AVs from different manufacturers or on-board equipment (OBE) providers. In some embodiments, the data input to the AV/HV identification neural network 102 includes, but is not limited to, car-following distance, preceding vehicle speed, following vehicle speed, and following vehicle acceleration. In some embodiments, the data input into the AV/HV identification neural network 102 has a predetermined input data time window (Δt), i.e., the input data represents data acquired during a predetermined window or length (or period) of time. In some embodiments, a short time window of data, for example, less than or equal to 5 seconds, is input into the AV/HV identification neural network 102. Accordingly, the AV/HV identification neural network 102 may be used to identify whether a vehicle is AV or not based on the data acquired during the input data tine window, for example, based on data from a few seconds of time. The AV/HV identification neural network 102 may be implemented using known machine learning models or network architectures as discussed further below including, but not limited to an artificial neural network (ANN), a long short-term memory (LSTM) network, logistic regression (LR), support vector machine (SVM), k-nearest neighbor (KNN), and random forest. In some embodiments, the AV/HV identification neural network 102 may be trained using the example system and method described below with respect to FIG. 5. In some embodiments, the AV/HV identification neural network may be trained using known methods.

As mentioned above, the trained AV/HV identification neural network 102 generates an AV/HV identifier output 104 based on the input data, including car following data, acquired during a predetermined time window. In some embodiments, the AV/HV identifier output 104 may provide a classification or label indicating the vehicle type as AV or HV. In some embodiments, the AV/HV identifier output 104 may be a binary indicator of the vehicle type, i.e., AV or HV. For example, a 1 may be used to represent AV and a 0 may be used to represent HV. In some embodiments, the AV/HV identification neural network 102 may also be trained and configured to further classify AVs from different manufacturers or on-board equipment (OBE) providers. Accordingly, in some embodiments, when a vehicle is identified as an AV, the AV/HV identifier output 104 may also include an identifier of an AV manufacturer or OBE provider. The AV/HV identifier output 104 may be provided to and displayed on a display 108 coupled to the processor 116 or stored on data storage (or memory) 110 coupled to the processor 116.

FIG. 2 illustrates a method for identifying autonomous vehicles (AVs) in accordance with an embodiment. The process illustrated in FIG. 2 is described below as being carried out by the system for identifying autonomous vehicles (AVs) as illustrated in FIG. 1. Although the blocks of the process are illustrated in a particular order, in some embodiments, one or more blocks may be executed in a different order than illustrated in FIG. 2, or may be bypassed.

At block 202, sensor data that is associated with at least two vehicles 114 may be received from one or more sensor(s) 112. The sensor(s) 112 may be, for example, a GPS sensor or a camera (e.g., to acquire video) that may be used to acquire, for example, position or trajectory data for the at least two vehicles. In some embodiments, the sensor(s) 112 may be implemented on-board the same vehicle as an AV/HV identification neural network 102. In some embodiments, the sensor(s) 112 may be implemented at a location external (or off-board) to the one more vehicles 114 in traffic, for example, as part of a roadside traffic monitoring system. At block 204, a set of data including at least car following data may be determined based on the sensor data. For example, in some embodiments, the data (e.g., raw data) acquired from sensor(s) 112 (e.g., position data from a GPS sensor or video) may be provided as input to the pre-processing module 106 which is configured to derive or extract additional types of data from the sensor data to be input to the AV/HV identification neural network 102. For example, the pre-processing module 106 may be configured to generate or extract car following distance and spacing, car following trajectory, vehicle speed, vehicle acceleration, etc. from GPS position data or video. In some embodiments, vehicle location may be determined based on the vehicle longitude and latitude. In some embodiments, a car following distance may be derived as the vehicle location difference minus vehicle length. In some embodiments, vehicle acceleration may be calculated as the first-order differential of the speed. In some embodiments, lateral movements may be determined based on the data from the sensor(s) 112. In some embodiments, the data to be input to the AV/HV identification neural network 102, for example, data such as distance, speed, and acceleration, may be standardized between $-1$ and 1.

At block 206, the determined set of data including at least car following data may be provided as input to the AV/HV identification neural network 102. In some embodiments, the data input to the AV/HV identification neural network 102 includes, but is not limited to, car-following distance, preceding vehicle speed, following vehicle speed, and following vehicle acceleration. In some embodiments, the data input into the AV/HV identification neural network 102 has a predetermined input data time window ($\Delta t$), i.e., the input data represents data acquired during a predetermined window or length (or period) of time. In some embodiments, a short time window of data, for example, less than or equal to 5 seconds, is input into the AV/HV identification neural network 102. Accordingly, the AV/HV identification neural network 102 may be used to identify whether a vehicle is AV or not based on the data acquired during the input data time window, for example, based on data from a few seconds of time. At block 208, an AV/HV identifier 104 for at least one vehicle 114 is generated based on the set of data (including car following data) for the predetermined time period using the AV/HV identification neural network 102. Accordingly, the AV/HV identification neural network 102 can generate an AV/HV identifier 104 based on the input data, including car following data, acquired during the predetermined time window. In some embodiments, the AV/HV identifier 104 may provide a classification or label indicating the vehicle type as AV or HV. In some embodiments, the AV/HV identifier 104 may be a binary indicator of the vehicle type, i.e., AV or HV. For example, a 1 may be used to represent AV and a 0 may be used to represent HV. In some embodiments, the AV/HV identification neural network 102 may also be trained and configured to further classify AVs from different manufacturers or on-board equipment (OBE) providers. Accordingly, in some embodiments, when a vehicle is identified as an AV, the AV/HV identifier output 104 may also include an identifier of an AV manufacturer or OBE provider. At block 210, the AV/HV identifier 104 may be provided to and displayed on a display 108 or stored on data storage (or memory) 110

Figure 3B:
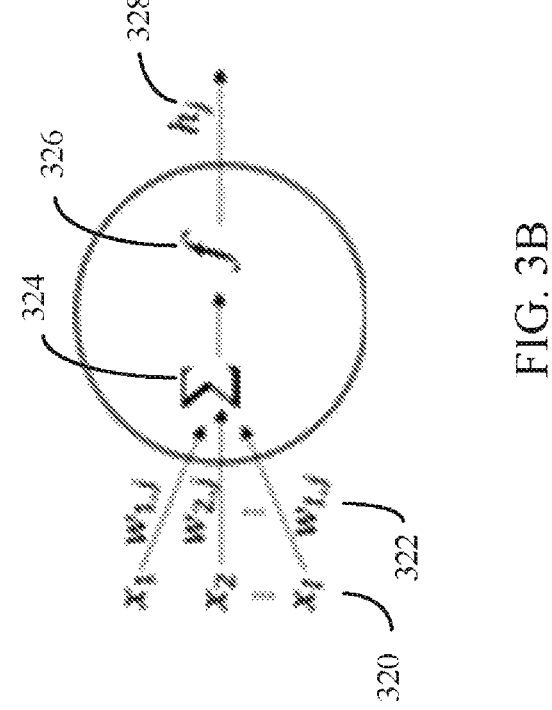
FIG. 3B illustrates an example ANN neuron structure in accordance with an embodiment.
Figure 3A:
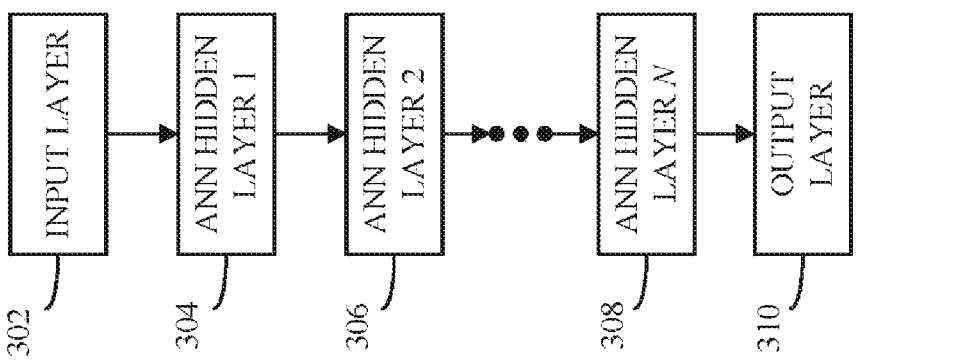
FIG. 3A illustrates an example artificial neural network (ANN) model structure in accordance with an embodiment.

As mentioned above, the AV/HV identification neural network 102 (shown in FIG. 1) may be implemented using known machine learning models or network architectures. In some embodiments, the AV/HV identification neural network 102 may be implemented as an artificial neural network (ANN). FIG. 3A illustrates an example artificial neural network (ANN) model structure in accordance with an embodiment and FIG. 3B illustrates an example ANN neuron structure in accordance with an embodiment. The example ANN model structure (or architecture) shown in FIG. 3A, can include an input layer 302, an output layer 310, and N hidden layers (e.g., a first ANN hidden layer 304, a second ANN hidden layer 306 and an Nth ANN hidden layer 308). In some embodiments, the numbers of hidden layers N, neurons $N_{neuron}$, batches $N_{batch}$, and epochs $N_{epoch}$ may be adjusted to avoid underfitting and overfitting for the best results. In FIG. 3B, the example ANN neuron structure can include neuron inputs 320 ($\{x_1, x_2, \ldots, x_I\}$), a neuron output 328 ($h_j$), weights 322 ($\{w_{1,j}, w_{2,j}, \ldots, w_{I,j}\}$), a sum of weighted inputs and bias 324 ($\Sigma$), and an activation function 328 ($f$), e.g., the rectified linear unit function.

Figure 4B:
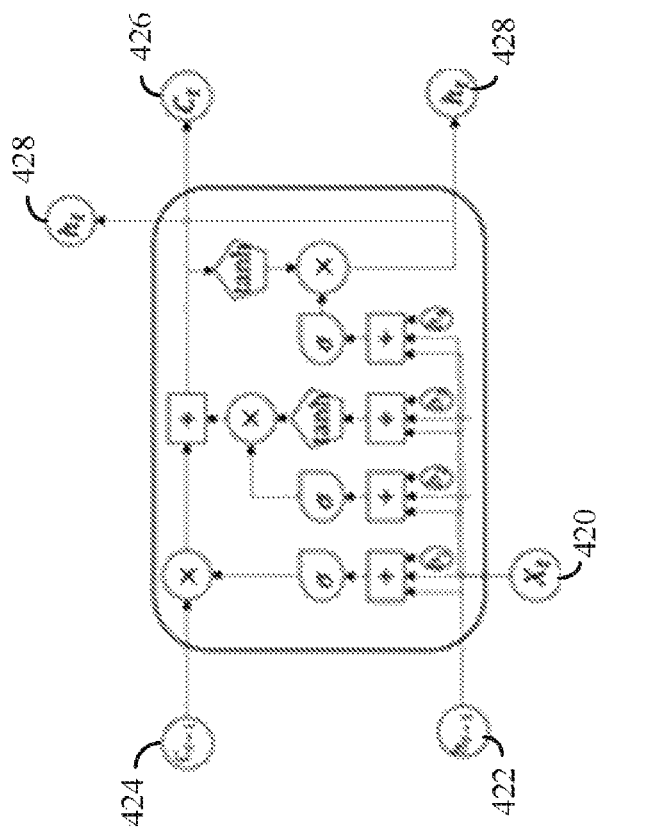
FIG. 4B illustrates an example LSTM network neuron structure in accordance with an embodiment.
Figure 4A:
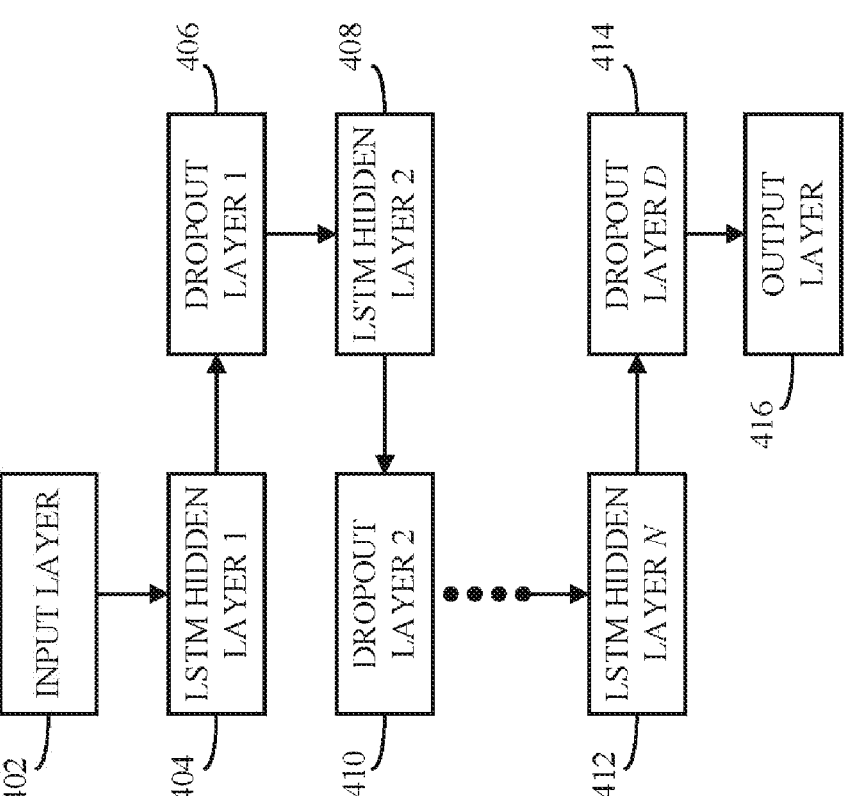
FIG. 4A illustrates an example long short-term memory (LSTM) network model structure in accordance with an embodiment.

In some embodiments, the AV/HV identification neural network 102 may be implemented as a long short-term memory (LSTM) network. FIG. 4A illustrates an example long short-term memory (LSTM) network model structure in accordance with an embodiment and FIG. 4B illustrates an example LSTM network neuron structure in accordance with an embodiment. The LSTM is a type of recurrent neural network. It is capable of learning order dependence in time series data. The example LSTM model structure (or architecture) shown in FIG. 4A can include an input layer 402, an output layer 416, N hidden layers (e.g., a first hidden layer 404, a second hidden layer 408, an Nth hidden layer 312), and D dropout layers (e.g., a first dropout layer 406, a second dropout layer 410, a Dth dropout layer 414) with dropout rates of $\alpha_k \in \{\alpha_1, \alpha_2, \ldots, \alpha_K\}$. In some embodiments, the numbers of hidden layers N, dropout layers D, neurons $N_{neuron}$, batches $N_{batch}$, and epochs $N_{epoch}$ and the dropout rate $\alpha_k$ may be adjusted to avoid underfitting and overfitting for the best results. In FIG. 4B, the example LSTM neuron structure can include a current input vector 420 ($X_t$), a current neuron output 428 ($h_t$), a memory from the last neuron 424 ($C_{t-1}$), an output of the last neuron 422 ($h_{t-1}$), and a memory from the current neuron 426 ($C_t$). The subscript t indexes the time step. $\times$ is element-wise multiplication. $+$ is the element-wise summation/concatenation. $\sigma$ is the sigmoid layer. tanh is the hyperbolic tangent layer. $\{b_1, b_2, b_3, b_4\}$ are biases.

In some embodiments, the AV/HV identification neural network 102 may be implemented as a logistic regression (LR) model. A LR model may be used to estimate the probability of a certain class via a logistic function. In some embodiments, for a binary independent variable, if the probability of being class 1 is greater than that of being class 0, the observation may be classified as 1. Otherwise, it may be classified as 0. In some embodiments, the AV/HV identification neural network 102 may be implemented as a support vector machine (SVM). A SVM model can find the best decision boundary, i.e., decision hyperplane, to separate different classes. The distance from the best hyperplane to the nearest data point of each class is the greatest. Different kernels may be tested to produce the best results. In some embodiments, the AV/HV identification neural network 102 may be implemented as a k-nearest neighbor (KNN) model. For the KNN model, first the Euclidean distance from the query observation to the classified observations may be calculated. The classified observations can be ordered by increasing distance. The class of the query observation may be the majority voting of the top k observation classes. The number of nearest neighbors k may be adjusted for the best model results. In some embodiments, the AV/HV identification neural network 102 may be implemented as a random forest (RF) model. A RF model can include T decision trees. The maximum depth of each decision tree is $N_T$. Each decision tree produces each result. The final result may be derived as the majority voting of all trees' results. The number of decision trees T and the maximum depth $T_N$ may be tuned for the best model performance.

Figure 5:
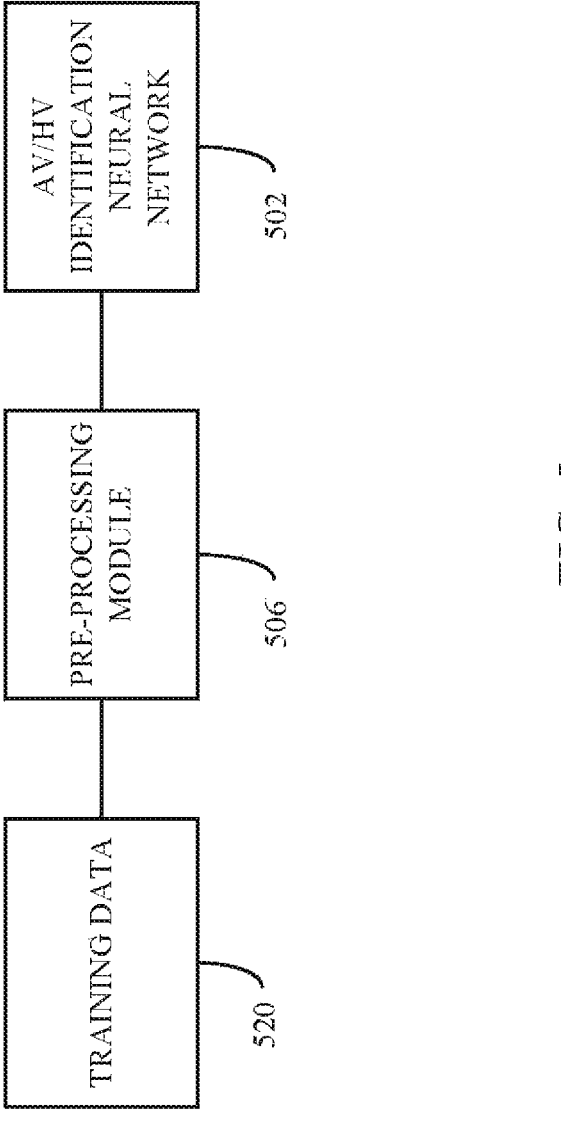
FIG. 5 is a block diagram of a system for training an autonomous vehicle (AV)/human-driven vehicle (HV) identification neural network in accordance with an embodiment.

FIG. 5 is a block diagram of a system for training an autonomous vehicle(AV)/human-driven vehicle (HV) identification neural network in accordance with an embodiment. In FIG. 5 training data (or dataset) 520 may be used to train the AV/HV identification neural network 502 (e.g., AV/HV identification neural network 102 shown in FIG. 1). In some embodiments, the training data 520 can include, for example, AV and HV car following data. In some embodiments, the training data may be existing datasets that include car-following data including trajectory data. In some embodiments, the training data 520 can include pure HV car following data, pure AV car following data and mixed traffic data. In some embodiments, the training data 520 can include car following data for AV vehicles from different manufacturers and can represent different traffic situations (e.g., stationary (constant speed), oscillated (traffic oscillation including decelerating and accelerating), low speed, high speed, different oscillation patterns).

In some embodiments, the training data 520, for example, trajectory data, may be pre-processed using a pre-processing module 506 (e.g. pre-processing module 106 shown in FIG. 1) to generate or extract additional types of data for input to the AV/HV identification neural network 502 during training. In some embodiments, the pre-processing of the training data may include, for example, 1) computing vehicle location from vehicle longitude and latitude; 2) conducting linear interpolation on location to fill up missing data; 3) deriving car-following distance as vehicle location difference minus vehicle length; 4) applying operations to ensure data in the training dataset 250 is consistent; 5) calculating vehicle acceleration as the first-order difference of vehicle speed; and 6) excluding unstable car-following periods, for example, data at the beginning or end of the test runs. In some embodiments, before training of the AV/HV identification neural network 502, the training data 250 may be segmented by a predetermined time window, $\Delta t$. Each segment may be defined as an observation.

In some embodiments, during training the parameters of the model implemented by the AV/HV identification neural network 102 (e.g., ANN, LSTM, LR, SVM, KNN, RF, etc.) may also be tuned for best performance. For example, model tuning may be conducted for different input data time windows $\Delta t$ regarding the overall identification accuracy $\alpha$, which is computed as:

$$\alpha = \frac{N_{AV}^{correct} + N_{HV}^{correct}}{N_{all}} \times 100\%, \qquad \text{Eq. 1}$$

where $$N_{AV}^{correct}$$

is the number of correctly identified AVs, $$N_{HV}^{correct}$$

is the number of correctly identified HVs, and $N_{all}$ is the total number of observations. In some embodiments, the tuning may be performed for a data time window $\Delta t$ ranging from 0.2s to 5s.

In some embodiments, the AV/HV identification neural network 502 may be implemented using an ANN. For tuning an ANN, in some embodiments, the best parameter combination (e.g., the numbers of ANN hidden layers N, ANN neurons $N_{neuron}$, batches $N_{batch}$, and epochs $N_{epoch}$) may be found that produces the highest identification accuracy given the car-following data in a time window $\Delta t$. In some embodiments, the AV/HV identification neural network 502 may be implemented using an LSTM network. For tuning the LSTM network, in some embodiments, the best parameter configuration (e.g., the numbers of hidden layers N, dropout layers D), neurons $N_{neuron}$, batches $N_{batch}$, and epochs $N_{epoch}$ and the dropout rate $\alpha_k$) may be found that produces the highest identification accuracy given the car following data in a time windows $\Delta t$. In some embodiments, for other models used to implement the HV/AV identification neural network, tuning may be performed to find the best model (e.g., model parameters) for a given time window $\Delta t$. In some embodiments, a separate AV/HV identification neural network 502 may be trained for different input data time windows $\Delta t$.

Figure 6:
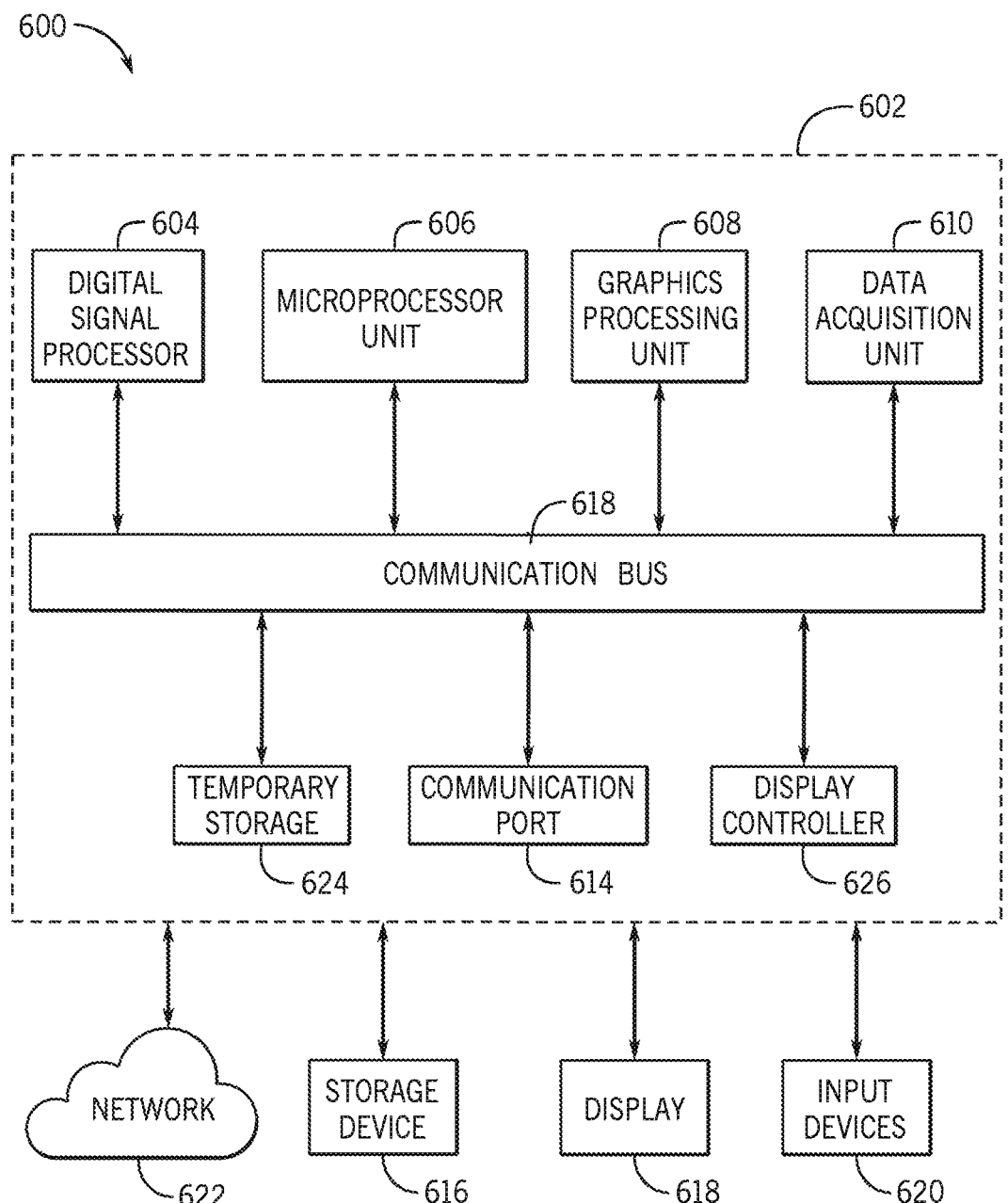
FIG. 6 is a block diagram of an example computer system in accordance with an embodiment.

FIG. 6 is a block diagram of an example computer system in accordance with an embodiment. Computer system 600 may be used to implement the systems and methods described herein. In some embodiments, the computer system 600 may be an on-board vehicle computer system, an off-board computer system external (or off-board) to one more vehicles in traffic (e.g., as part of a roadside traffic monitoring system), a workstation, a notebook computer, a tablet device, a mobile device, a multimedia device, a network server, a mainframe, one or more controllers, one or more microcontrollers, or any other general-purpose or application-specific computing device. The computer system 600 may operate autonomously or semi-autonomously, or may read executable software instructions from the memory or storage device 616 or a computer-readable medium (e.g., a hard drive, a CD-ROM, flash memory), or may receive instructions via the input device 620 from a user, or any other source logically connected to a computer or device, such as another networked computer or server. Thus, in some embodiments, the computer system 600 can also include any suitable device for reading computer-readable storage media.

Data, such as data acquired with, for example, one or more sensors (e.g., on-board vehicle sensors or roadside sensors), may be provided to the computer system 600 from a data storage device 616, and these data are received in a processing unit 602. In some embodiments, the processing unit 602 included one or more processors. For example, the processing unit 602 may include one or more of a digital signal processor (DSP) 604, a microprocessor unit (MPU) 606, and a graphic processing unit (GPU) 608. The processing unit 602 also includes a data acquisition unit 610 that is configured to electronically receive data to be processed. The DSP 604, MPU 606, GPU 608, and data acquisition unit 610 are all coupled to a communication bus 612. The communication bus 612 may be, for example, a group of wires, or a hardware used for switching data between the peripherals or between any component in the processing unit 602.

The processing unit 602 may also include a communication port 614 in electronic communication with other devices, which may include a storage device 616, a display 618, and one or more input devices 620. Examples of an input device 620 include, but are not limited to, a keyboard, a mouse, and a touch screen through which a user can provide an input. The storage device 616 may be configured to store data, which may include data such as, for example, training data, sensor data including car following data, preceding vehicle speed, following vehicle speed, following vehicle acceleration, AV/HV identifier data, etc., whether these data are provided to, or processed by, the processing unit 602. The display 618 may be used to display images and other information, such as patient health data, and so on.

The processing unit 602 can also be in electronic communication with a network 622 to transmit and receive data and other information. The communication port 614 can also be coupled to the processing unit 602 through a switched central resource, for example the communication bus 612. The processing unit 702 can also include temporary storage 624 and a display controller 626. The temporary storage 624 is configured to store temporary information. For example, the temporary storage can be a random access memory.

As those skilled in the art will readily appreciate, various aspects described throughout this disclosure may be extended to other systems, apparatuses, and modules.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-6 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged.

What is claimed is:

1. A system for identifying whether vehicles in traffic are operating as autonomous or human-driven, comprising:
   at least one sensor configured to acquire raw sensor data of a traffic stream in which a first vehicle is in motion, wherein the traffic stream contains at least a second vehicle and a third vehicle, and wherein the at least one sensor includes at least one of a camera and a global positioning system (GPS);
   a processing unit on board the first vehicle;
   a data acquisition unit coupled to the at least one sensor to receive the raw sensor data for a first time window while the first vehicle is in motion;
   a communication bus coupled to the processing unit and the data acquisition unit to communicate the raw sensor data for the first time window to the processing unit while the first vehicle is in motion; and
   a memory on board the first vehicle having stored thereon a set of software instructions which, when executed by the processing unit while the first vehicle is in motion, cause the processing unit to:
      pre-process the raw sensor data to extract a set of dynamic performance data comprising a car following distance between the second vehicle and the third vehicle, a preceding vehicle speed, a following vehicle speed, a following vehicle acceleration, and a car following trajectory; and
      process the set of dynamic performance data using an autonomous vehicle (AV)/human-driven vehicle (HV) identification neural network to generate an AV/HV identifier for at least one of the second vehicle and the third vehicle, wherein the AV/HV identification neural network was trained on training data comprising dynamic performance data in durations equal to the first time window.

2. The system according to claim 1, wherein the first time window is between 0.2s to 5s.

3. The system according to claim 2, wherein the pre-processing and AV/HV identifier generation occur prior to conclusion of a second time window, the second time window occurring after, and being of equal duration as, the first time window.

4. The system according to claim 3 wherein the instructions further cause the processing unit to process dynamic performance data derived from raw sensor data during the second time window, and generate an updated AV/HV identifier for at least one of the second vehicle and the third vehicle.

5. The system according to claim 1, wherein the AV/HV identification neural network is configured to receive as inputs solely the raw sensor data or extracts thereof.

6. The system according to claim 1, wherein the AV/HV identification neural network was tuned via a set of parameters, at least one of which was a duration of a sensor data time window based on which the AV/HV identification neural network generates the identifier, the duration being between 0.2 to 5s.

7. The system according to claim 6, further comprising a second AV/HV identification neural network trained for a sensor data time window different than the sensor data time window of the AV/HV identification neural network.

8. The system according to claim 1, wherein the set of dynamic performance data further comprises lateral movement data.

9. The system according to claim 1, further comprising a display coupled to the AV/HV identification neural network, the display configured to display a current AV/HV identifier associated with at least one of the second vehicle and the third vehicle.

10. The system according to claim 1, wherein the AV/HV identification neural network is further configured to identify a manufacturer associated with at least one of the second vehicle and the third vehicle.

* * * * *